United States Patent Office 3,658,949
Patented Apr. 25, 1972

3,658,949
PROCESS FOR PRODUCING MODIFIED POLY-
PHENYLENE OXIDE COMPOSITION
Seizo Nakashio, Nishinomiya, Toshio Takemura, Kyoto, and Kunio Ota, Takatsuki, Japan, assignors to Sumitomo Chemical Company, Limited, Osaka, Japan
No Drawing. Filed Dec. 7, 1970, Ser. No. 95,871
Int. Cl. C08f 29/12
U.S. Cl. 260—897 R
15 Claims

ABSTRACT OF THE DISCLOSURE

A polyphenylene oxide composition which has a greatly improved impact resistance and, in addition, excellent heat and chemical resistance as well as distinguished mechanical and electrical properties is obtained by oxidatixe coupling-polymerization of phenols in the persence of at least one polymer selected from the group consisting of ethylene-α-olefin copolymers and ethylene-α-olefin-polyene terpolymers. Moreover, said composition shows no tendency toward phase separation.

---

The present invention relates to a process for producing a modified polyphenylene oxide composition, and more particularly, to the process of producing such a composition, which comprises polymerizing phenols by oxidative coupling technique in the presence of an ethylene-α-olefin copolymer or ethylene-α-olefin-polyene terpolymer.

While polyphenylene oxide has drawn much attention as a resin having excellent heat and chemical resistances, as well as excellent mechanical, electrical and other properties, its impact resistance is not sufficiently high.

Concerning the blending of polyphenylene oxide with rubber, there has already been known Japanese patent publication No. 1,482/68 which relates to a composition comprising rubber as a major component, and specifies that the amount of polyphenylene oxide incorporated in the composition is preferably less than 40 parts against 60 parts of rubber. In such a rubber composition the excellent heat resistance of polyphenylene oxide is no longer taken advantage of.

On the other hand, it has also been proposed to blend a minor amount of a rubber-like polymer with polyphenylene oxide in order to improve the impact resistance of polyphenylene oxide without injuring its excellent heat resistance. However, when unsaturated rubbers, such as polybutadiene, polyisoprene (including natural rubber), polychloroprene, or the like, are used as the rubber-like polymer the resulting composition has unsatisfactory resistance to ozone, weathering and heat. On the other hand, whereas saturated rubbers, such as ethylene-propylene rubber, ethylene-propylene-diene terpolymer, and the like, have superior resistance to ozone, weathering and heat, compared with unsaturated rubbers, they are not sufficiently compatible with polyphenylene oxides. When blended with polyphenylene oxide, and particularly as a result of thermal history, said saturated rubbers generally tend to cause phase separation, and fail to produce the expected result.

The present inventors have found that whereas the above-said defect of the polyphenylene oxide composition cannot be overcome by blending in solution of a polyphenylene oxide and an ethylene-α-olefin copolymer or ethylene-α-olefin-polyene terpolymer because of insufficient compatibility, it is possible to obtain a polyphenylene oxide composition with greatly improved impact resistance as well as with uninjured heat resistance by polymersing phenols by oxidative coupling in the presence of an ethylene-α-olefin copolymer or ethylene-α-olefin-polyene terpolymer, whereby the ethylene-α-olefin copolymer or ethylene-α-olefin-polyene terpolymer is grafted onto the polyphenylene oxide formed and the compatibility of the components is so good that the phase separation would not occur.

An object of the present invention is to provide a process for producing a modified polyphenylene oxide composition.

Another object of the invention is to provide a process for producing a polyphenylene oxide composition having greatly improved impact resistance, yet retaining other properties uninjured.

A further object of the invention is to provide a process for producing a polyphenylene oxide composition having improved impact resistance and no tendency toward phase separation by polymerizing phenols by oxidative coupling in the presence of an ethylene-α-olefin copolymer or ethylene-α-olefin-polyene terpolymer.

Other objects and advantages of the invention will be apparent from the description set forth hereinafter.

According to the present invention, there is provided a process for producing a modified polyphenylene oxide composition by polymerizing by oxidative coupling at least one phenol represented by the formula,

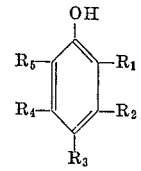

wherein $R_1$, $R_2$, $R_3$, $R_4$ and $R_5$ are each a hydrogen or halogen atom or a hydrocarbon, halogen-substituted hydrocarbon, cyano-substituted hydrocarbon, hydrocarbonoxy or halogen-substituted hydrocarbonoxy group which ave 1–7 carbon atoms, at least one of $R_1$–$R_5$ being a hydrogen atom and at least one of the remaining $R_1$–$R_5$ being other than a hydrogen atom, in the presence of an ethylene-α-olefin copolymer or ethylene-α-olefin-polyene terpolymer. Individual examples of $R_1$, $R_2$, $R_3$, $R_4$ and $R_5$ of the phenols for use in the present invention are hydrogen, chlorine, bromine, iodine, methyl, ethyl, propyl, allyl, phenyl, benzyl, methylbenzyl, chloromethyl, bromomethyl, cyanoethyl, methoxy, chloromethoxy, ethoxy, phenoxy, etc.

Individual examples of the phenols for use in the invention include 2-methylphenol,
3-methylphenol,
2-ethylphenol,
4-methylbenzylphenol,
2,6-dimethylphenol,
2-methyl-6-ethylphenol,
2-methyl-6-allylphenol,
2,6-diallylphenol,
2,6-diphenylphenol,
2,6-dichlorophenol,
2,4-dibenzylphenol,
4-bromomethylphenol,
2-cyanomethyl-6-methylphenol,
2-methyl-6-bromophenol,
2,4-methyl-6-bromophenol,
2,4-dimethyl-3-chlorophenol,
3,5-dimethyl-2,4-dichlorophenol,
3-methoxyphenol,
2,6-dimethoxyphenol,
2,6-dichloromethoxyphenol,
2,5-dimethylphenol, etc. These phenols may be used each alone, or in combination for the production of copolymers.

According to the process of the present invention the polymerization reaction by the oxidative coupling of the phenol is conducted in the presence of a catalyst system consisting of a compound comprising a transition metal. Examples of the catalyst system used in the oxidative coupling of phenols include cuprous salt-tertiary amine (e.g., Japanese patent publication Nos. 18,692/61 and 14,645/62), silver oxide, lead acetate, manganese dioxide (e.g., Japanese patent publication No. 10,092/62), basic cupric salt-amine (e.g., Japanese patent publication Nos. 29,373/64), 16,423/65, and 22,269/65), nickel peroxide (e.g., Japanese patent publication No. 27,068/67 and Dutch patent application No. 67—12,144), manganese compound-tertiary amine (e.g., Japanese patent publication No. 3,195/67), manganese-tertiary amine-alcohol (e.g., Dutch patent application No. 68—01,524), manganese, cobalt, copper compound-alkali metal alcoholate or phenolate (e.g., Dutch patent application No. 68—04,186), copper salt-amine-alcohol (e.g., Dutch patent application No. 67—06,964), catalyst system containing ruthenium, palladium, iridium, or platinum (e.g., Dutch patent application No. 68—12,423), transition metal salt-water-ammonia (e.g., Dutch patent application No. 66—16,789), cobalt-amine (e.g., Dutch patent application No. 64—03,375), alkali metal ferricyanate-amine (e.g., U.S. Pat. No. 3,342,892), copper-amine-alkali metal phenolate (U.S. Pat. No. 3,442,855), etc.

The α-olefin as the second monomer in the ethylene-α-olefin copolymer and ethylene-α-olefin-polyene terpolymer for use in the present invention may be any α-olefin having 3 to 20 carbon atoms. Examples of such olefins include propylene, 1-butene, 1-pentene, 1-hexene, 1-heptene, styrene, p-isopropylstyrene, vinylcyclohexane, etc. Among these olefins propylene is especially important.

Examples of the polyene compound as the third monomer in the ethylene-α-olefin-polyene terpolymer for use in the present invention include 1,4-hexadiene,
1,6-octadiene,
2-methyl-1,5-hexadiene,
6-methyl-1,5-heptadiene,
7-methyl-1,6-octadiene,
11-ethyl-1,11-tridecadiene,
9-ethyl-1,9-undecadiene,
isoprene,
1,4-pentadiene,
1,3-pentadiene,
1,4,9-decatriene,
myrcene,
1-phenyl-1,3-butadiene,
p-diallylbenzene,
p-bromoallylbenzene,
4-vinyl-1-cyclohexene,
1,3,5-trivinylcyclohexane,
trans-1,2-divinylcyclobutane,
1,5-cyclooctadiene,
1,3,5-cycloheptatriene,
1,5,9-cyclododecatriene,
1,4-cycloheptadiene,
cyclopentadiene,
2,2'-dicyclopentenyl,
1,4-bis(cyclopenten-2-yl)-butane,
4,7,8,9-tetrahydroindene,
6-methyl-4,7,8,9-tetrahydroindene,
bicyclo(3,3,0)-octadiene-2,6-dicyclopentadiene,
2-methyl-2,5-norbornadiene,
5-methylene-2-norbornene,
5-ethylidene-2-norbornene,
5-isopropylidene-2-norbornene,
5'-isopropenyl-2-norbornene,
5-(2'-methyl-1'-propenyl)-2-norbornene,
5-(1',2'-dimethyl-1'-propenyl)-2-norbornene,
5-(2'-butenyl)-2-norbornene,
6-methyl-5-(2'-butenyl)-2-norbornene,
6-(3'-cyclohexenyl)-2-norbornene,
tricyclopentadiene,
6-chloromethyl-5-isopropenyl-2-norbornene,
etc.

Proportions of ethylene, α-olefin and polyene compound in the ethylene-α-olefin copolymer and ethylene-α-olefin-polyene terpolymer for use in the present invention are 40 to 90 mol-percent of ethylene, 10 to 60 mol-percent of α-olefin, and 0 to 20 mol-percent of polyene compound, preferably 60 to 85 mol-percent of ethylene, 15 to 35 mol-percent of α-olefin, and 0 to 5 mol-percent of polyene compound, though other proportions than those given above may be used.

In the present invention, any polymer selected from the ethylene-α-olefin copolymers and ethylene-α-olefin-polyene terpolymers may be used each alone or in combination of two or more polymers.

Also included in the scope of the present invention are the cases where in place of ethylene-α-olefin copolymers and ethylene-α-olefin-polyene terpolymers the halogenated products or hydroperoxides derived from these polymers are used.

The modified polyphenylene oxide composition obtained according to the present invention may contain any proportion of the ethylene-α-olefin copolymer or ethylene-α-olefin-polyene terpolymer. However, in order that the composition may retain the characteristic properties of the polyphenylene oxide, such as heat resistance, etc., the proportion of ethylene-α-olefin copolymer or ethylene-α-olefin-polyene terpolymer in the modified composition is preferably less than 20% by weight, more preferably 0.5 to 15% by weight.

In order to smoothly carry out the present process, the oxidative coupling of a phenol is generally effected in a solution of ethylene-α-olefin copolymer or ethylene-α-olefin-polyene terpolymer in suitable solvents. The co-presence of poor solvents for ethylene-α-olefin copolymer or ethylene-α-olefin-polyene terpolymer is not objectionable, but it is preferable that ethylene-α-olefin copolymer or ethylene-α-olefin-polyene terpolymer will substantially not be precipitated.

Examples of suitable solvents include noncyclic or cyclic aliphatic hydrocarbons, aromatic hydrocarbons, and derivatives of these hydrocarbons such as, for example, nitro compounds, halogenated compounds, ethers, ketones, lactones, sulfonated compounds, etc.; and more particularly, heptane, benzene, toluene, xylene, monochlorobenzene, dichlorobenzenes, nitrobenzene, methylcyclohexane, 2-methoxyethanol, dichloromethane, dichloroethanes, chloroform, diethyl ether, tetrahydrofuran, dioxanes, cyclohexanone, ethyl acetate, propiolactone, acetonitrile, etc.

These solvents are used in an amount of 1 to 10,000 times, preferably 3 to 1,000 times the weight of ethylene-α-olefin copolymer or of ethylene-α-olefin-polyene terpolymer, and 1 to 100 times, preferably 5 to 20 times the weight of monomeric phenol.

Alternatively, a phenol containing ethylene-α-olefin copolymer or ethylene-α-olefin-polyene terpolymer dissolved therein may be polymerized without using any other solvent.

The reaction temperature in the present process varies depending on the kind of phenol and on the catalyst system used for polymerizing the phenol, but in order to avoid the occurrence of side reactions a temperature lower than 150° C., preferably 0° to 100° C. is usually used. When no solvent is used, a reaction temperature of above the melting point of the phenol is necessary.

The recovery of the modified polyphenylene oxide composition is ordinarily effected after completion of the oxidative coupling polymerization by contacting the reaction mixture with a non-solvent for the ethylene-α-olefin copolymer, ethylene-α-olefin-polyene terpolymer, and polyphenylene oxide compound, and separating the precipitated polyphenylene oxide composition. Alternatively, other suitable procedures for the recovery may be used.

The invention is illustrated below with reference to examples, which are presented merely illustrative and are not intended to be limitative, since many modifications thereof are possible within the scope of the invention.

EXAMPLE 1

Into a four-necked flask equipped with a thermometer, a condenser, a dropping funnel, a stirrer, and a gas-introducing tube, were charged 293 g. of xylene and 6.1 g. of an ethylene-propylene-dicyclopentadiene terpolymer (Royalene 301, trademark of Uniroyal Co.), and the mixture was stirred to dissolve the terpolymer. Then a solution of 1.26 g. of manganese chloride in 44.3 g. of methanol and 36.8 g. of a methanol solution containing 8.11 g. of sodium methylate were added to the flask, and oxygen was introduced with stirring into the mixture at a rate of 0.5 l./min. at 30° C. Subsequently, a solution of 122.0 g. of 2,6-xylenol in 122 g. of xylene was charged into the flask, and the mixture was reacted with stirring at 30° C. for 180 minutes while oxygen is introduced continuously.

The reaction mixture was poured into a large volume of methanol containing a small amount of hydrochloric acid. The precipitate formed was collected by filtration, washed with methanol, and dried to obtain 122.3 g. of a white powder of a modified polyphenylene oxide composition (composed of 4.98 parts by weight of ethylene-propylene-dicyclopentadiene terpolymer component and 95.02 parts by weight of poly-2,6-dimethyl-1,4-phenylene-oxide component). The intrinsic viscosity of this modified polyphenylene oxide composition was 0.60 dl./g., as measured in chloroform at 25° C.

The modified polyphenylene oxide composition obtained was milled on a roller mill at 290° C. for 7 minutes, and pressed at 280° C. under a pressure of 120 kg./cm.$^2$ for 5 minutes or for 15 minutes to prepare test pieces for measuring impact strength.

On the other hand, for the purpose of comparison 95.02 parts by weight of a polyphenylene oxide having an intrinsic viscosity of 0.56 dl./g. as measured in chloroform at 25° C., which was obtained by polymerizing 2,6-xylenol in a manner similar to that mentioned above except that no ethylene-propylene-dicyclopentadiene terpolymer was used, and 4.98 parts by weight of the above-said ethylene-propylene-dicyclopentadiene terpolymer were solution-blended to obtain a composition composed of ethylene-propylene-dicyclopentadiene terpolymer and poly-2,6-dimethyl-1,4-phenylene oxide. The intrinsice viscosity of this composition was 0.61 dl./g. as measured in chloroform at 25° C. The composition was milled on a roller mill at 290° C. for 7 minutes and pressed at 280° C. under a pressure of 120 kg./cm.$^2$ for 5 minutes or for 15 minutes to prepare test pieces for measuring impact strength.

Charpy impact strength (notched, 20° C.) was measured on each test piece thus prepared in accordance with the testing method of ASTM D256-54T. The results obtained are as shown in Table 1.

TABLE 1

|  | Present composition | | Comparative composition | |
|---|---|---|---|---|
| Pressing time, min | 5 | 15 | 5 | 15 |
| Charpy impact strength, kg.-cm./cm.$^2$ | 24 | 23 | 15 | 7 |

In the case of modified polyphenylene oxide composition, test pieces all showed a whitened fracture on impact, whereas in the case of polyphenylene oxide composition obtained by solution-blending, the Charpy impact strength of the test specimen was 7 kg.-cm./cm.$^2$ and test pieces showed a partially whitened fracture because of the phase separation between ethylenepropylene-dicyclopentadiene terpolymer and polyphenylene oxide.

When 10.00 g. of each of the polyphenylene oxide compositioned obtained according to the present invention and the polyphenylene oxide composition obtained by solution-blending was extracted with hot pyridine which dissolves poly-2,6-dimethyl-1,4-phenylene oxide but not ethylene-propylene-dicyclopentadiene terpolymer, the extraction residue of the former composition weighed 0.249 g. whereas that of the latter composition was 0.496 g. From these results it was found that in the polyphenylene oxide composition obtained by the present process 52.0% by weight of ethylene-propylene-dicyclopentadiene terpolymer based on the total weight of ethylene-propylene-dicyclopentadiene terpolymer in the polyphenylene oxide composition were grafted onto the poly-2,6-dimethyl-1,4-phenylene oxide.

Since it is known that some methyl groups at 2- and 6-position are converted into methylol groups and aldehyde groups by oxidation during polymerization by oxidative coupling, the content of hydroxyl groups in polyphenylene oxide alone, a solution-blended polyphenylene oxide composition, and a polyphenylene oxide composition obtained by the present process were determined to obtain the following results: 0.13% by weight and 0.12% by weight respectively for the former two, and 0.03% by weight for the polyphenylene oxide composition obtained by the present process.

EXAMPLE 2

The procedure of Example 1 was repeated on a scale enlarged 40 times using a 50 l. reactor to obtain 4,938 g. of a modified polyphenylene oxide composition (composed of 4.96 parts by weight of ethylene-propylene-dicyclopentadiene terpolymer component and 95.04 parts by weight of poly-2,6-dimethyl-1,4-phenylene oxide component). The intrinsic viscosity of this modified polyphenylene oxide composition was 0.57 dl./g. as measured in chloroform at 25° C.

On the other hand, for the purpose of comparison, 95.04 parts by weight of a polyphenylene oxide having an intrinsic viscosity of 0.51 dl./g. as measured in chloroform at 25° C., which was obtained by polymerizing 2,6-xylenol in a manner similar to that mentioned above except that no ethylene-propylene-dicyclopentadiene terpolymer was used, and 4.96 parts by weight of the above-said ethylenepropylene - dicyclopentadiene terpolymer were solution-blended to obtain a composition composed of ethylene-propylene-dicyclopentadiene terpolymer and poly-2,6-dimethyl-1,4-phenylene oxide. The intrinsic viscosity of this composition was 0.56 dl./g. as measured in chloroform at 25° C.

The compositions thus obtained were pelletized at 310° C., and the pellets were injection molded at a molding machine temperature of 310° C. using ⅔-oz. vertical injection machine of the plunger-type. The piece molded from the solution-blended polyphenylene oxide composition showed phase separation between the ethylene-propylene-polyene terpolymer and the polyphenylene oxide. whereas the piece molded from the modified polyphenylene oxide composition obtained by the present process showed no phase separation.

A tensile test and a bending test were conducted on pieces of both the composition obtained by the present process and the unmodified polyphenylene oxide. The results obtained are as shown in Table 2.

TABLE 2

|  | Present composition | Unmodified polyphenylene oxide |
|---|---|---|
| Tensile strength, kg./cm.$^2$ | 730 | 750 |
| Bending strength, kg./cm.$^2$ | 950 | 940 |

The tensile test was performed according to the method of ASTM D638-52T using autograph (Type P100, Shimadzu Seisakusho Ltd.) on the JIS No. 3 dumbbell test piece of 1 mm. in thickness, prepared from the press sheet at a tensile rate of 10 mm./min. at 20° C. The bending test was performed according to the method of ASTM D790–49T using the above-said autograph at a distance between supporting points of 100 mm. and at a loading rate of 2.5 mm./min.

EXAMPLE 3

The procedure of Example 1 was repeated except that 2.4 g., 4.9 g., 7.3 g., and 12.2 g. of an ethylene-propylene-dicyclopentadiene terpolymer (Royalene 301, trademark of Uniroyal Co.) were used, and each amount of xylene and methanol used was 2 times that used in Example 1. The modified polyphenylene oxide composition obtained was milled on a roller mill at 290° C. for 7 min. and pressed at 280° C. and a pressure of 120 kg./cm.$^2$ for 15 minutes to prepare test pieces for measuring the impact strength. The impact strength was measured according to the method of ASTM D256–54T on the piece thus prepared. The results obtained are as shown in Table 3.

The Charpy impact strength of the composition was 22 kg.-cm./cm.$^2$ as measured in the same manner as in Example 1. Test pieces all showed completely whitened fracture on impact.

What we claim is:

1. A process for producing a modified polyphenylene oxide composition, which comprises polymerizing at a temperature lower than 150° C. by oxidative coupling in the presence of a catalyst system consisting of a compound comprising a transition metal at least one phenol of the formula,

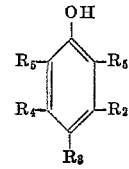

TABLE 3

| Starting material | | Polyphenylene oxide composition | | | | |
|---|---|---|---|---|---|---|
| 2,6-xylenol, g. | Terpolymer, g. | Yield, g. | Intrinsic viscosity, dl./g. | Terpolymer component, percent by wt. | Polyphenylene oxide component, percent by wt. | Charpy strength, kg.-cm./cm.$^2$ |
| 122.0 | 2.4 | 118.7 | 0.58 | 2.0 | 98.0 | 14 |
| 122.0 | 4.9 | 120.7 | 0.59 | 4.1 | 95.9 | 21 |
| 122.0 | 7.3 | 123.0 | 0.62 | 5.9 | 94.1 | 26 |
| 122.0 | 12.2 | 127.9 | 0.66 | 9.6 | 90.4 | 29 |

EXAMPLE 4

In a manner similar to that in Example 1, 2,6-xylenol was polymerized in the presence of ethylenepropylene copolymer (Dutral N, trademark of Montecatini Co.) and ethylene-propylene-1,4-hexadiene terpolymer (Nordel-1440, trademark of Du Pont Co.) to obtain modified polyphenylene oxide compositions. The Charpy impact strength was measured on said compositions in a manner similar to that in Example 3. The results obtained are as shown in Table 4.

TABLE 4

| | Polyphenylene oxide composition | | |
|---|---|---|---|
| Copolymer | Copolymer component, percent by wt. | Polyphenylene oxide component, percent by wt. | Charpy impact strength, kg.-cm./cm.$^2$ |
| Dutral N | 5.1 | 94.9 | 21 |
| Nordel-1440 | 4.9 | 95.1 | 23 |
| Royalene 501 | 4.8 | 95.2 | 20 |

EXAMPLE 5

5.0 g. of an ethylene-propylene-ethylidenenorbornene terpolymer (Royalene 501, trademark of Uniroyal Co.) was dissolved in 750 g. of xylene. Then 106 g. of 2,6-xylenol, 1.4 g. of cuprous chloride, and 83 g. of pyridine were added to the mixture. The polymerization was carried out at 25° to 30° C. for 130 minutes while introducing oxygen. The reaction mixture was treated in a manner similar to that in Example 1 to obtain 105.7 g. of a modified polyphenylene oxide composition (composed of 4.7 parts by weight of ethylene-propylene-ethylidenenorbornene terpolymer component and 95.3 parts by weight of poly-2,6-dimethyl-1,4-penylene oxide component). The intrinsic viscosity of this modified polyphenylene oxide composition was 0.57 dl./g. as measured in chloroform at 25° C.

wherein $R_1$, $R_2$, $R_3$, $R_4$ and $R_5$ are each a hydrogen or halogen atom, or a hydrocarbon, halogen-substituted hydrocarbon, cyano-substituted hydrocarbon, hydrocarbonoxy or halogen-substituted hydrocarbonoxy group which have 1–7 carbon atoms, at least one of $R_1$–$R_5$ being a hydrogen atom at least one of the remaining $R_1$–$R_5$ being other than a hydrogen atom, in the presence of from 0.5 to 20% by weight based on the weight of the modified polyphenylene oxide composition of at least one polymer selected from the group consisting of ethylene-α-olefin copolymers and ethylene-α-olefinpolyene terpolymers.

2. A process according to claim 1, wherein the amount of the polymer selected from the group consisting of ethylene-α-olefin copolymers and ethylene-α-olefinpolyene terpolymers is 0.5 to 15% by weight based on the weight of the modified polyphenylene oxide composition.

3. A process according to claim 1, wherein the α-olefin is propylene.

4. A process according to claim 1, wherein at least one of $R_1$ and $R_5$ is alkyl group.

5. A process according to claim 1, wherein the phenol is 2,6-xylenol.

6. A process according to claim 1, wherein the ethylene-α-olefin-polyene terpolymer is ethylene-propylene-dicyclopentadiene terpolymer, ethylene-propylene-ethylidenenorbornene, ethylidene-norbornene terpolymer, or ethylene-propylene-1,4-hexadiene terpolymer.

7. A process according to claim 1, wherein the ethylene-α-olefin copolymer is ethylene-propylene copolymer.

8. A process according to claim 1, wherein the catalyst for the polymerization by oxidative coupling is a manganese compound.

9. A process according to claim 1, wherein the catalyst for the polymerization by oxidative coupling is a copper compound.

10. A process according to claim 1, wherein the catalyst for the polymerization by oxidative coupling is a cobalt compound.

11. A process according to claim 8, wherein the manganese compound is a member selected from the group consisting of manganese chloride, manganese sulfate, manganese acetate and potassium permanganate.

12. A process according to claim 9, wherein the copper compound is a member selected from the group consisting of cupross chloride and cupric chloride.

13. A process according to claim 10, wherein the cobalt compound is cobalt chloride.

14. A process according to claim 1, wherein the reaction temperature is 0°–150° C.

15. A modified polyphenylene oxide composition produced by the process of claim 1.

References Cited

UNITED STATES PATENTS

| 3,383,340 | 5/1968 | MacCallum | 260—3 |
| 3,361,851 | 1/1968 | Gowan | 260—897 |
| 3,356,761 | 12/1967 | Fox | 260—874 |

MURRAY TILLMAN, Primary Examiner

C. SECCURO, Assistant Examiner

U.S. Cl. X.R.

260—889, 897 C

UNITED STATES PATENT OFFICE
CERTIFICATE OF CORRECTION

Patent No. 3,658,949        Dated April 25, 1972

Inventor(s) Seizo Nakashio et al.

It is certified that error appears in the above-identified patent and that said Letters Patent are hereby corrected as shown below:

In column 1, after line 8: please insert the following missing claim for priority:

--Japanese Appln. No. 100299/69 filed December 12, 1969--

Signed and sealed this 17th day of October 1972.

(SEAL)
Attest:

EDWARD M. FLETCHER, JR.
Attesting Officer

ROBERT GOTTSCHALK
Commissioner of Patents